US012229393B2

(12) United States Patent
Xiong et al.

(10) Patent No.: US 12,229,393 B2
(45) Date of Patent: Feb. 18, 2025

(54) ADAPTIVE DISPLAY SCREEN PARTITIONING

(71) Applicant: DELL PRODUCTS L.P., Round Rock, TX (US)

(72) Inventors: Dengzhai Xiong, Singapore (SG); Karthikeyan Krishnakumar, Austin, TX (US); Boon Kiat Law, Singapore (SG)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/169,744

(22) Filed: Feb. 15, 2023

(65) Prior Publication Data

US 2024/0272780 A1    Aug. 15, 2024

(51) Int. Cl.
| | |
|---|---|
| *G06F 3/0481* | (2022.01) |
| *G06F 3/04845* | (2022.01) |
| *G06T 3/153* | (2024.01) |
| *G06T 3/40* | (2006.01) |

(52) U.S. Cl.
CPC ........ *G06F 3/04845* (2013.01); *G06F 3/0481* (2013.01); *G06T 3/153* (2024.01); *G06T 3/40* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 10,176,784 B2 | 1/2019 | Ong et al. | |
| 10,854,170 B2 | 12/2020 | Khen et al. | |
| 2006/0190833 A1* | 8/2006 | SanGiovanni | G06F 3/0482 715/767 |
| 2014/0218298 A1 | 8/2014 | Law et al. | |
| 2015/0074589 A1* | 3/2015 | Pan | G06F 3/04886 715/781 |
| 2016/0134925 A1* | 5/2016 | Lee | H04N 21/4858 725/38 |
| 2016/0212486 A1* | 7/2016 | Liu | H04N 21/47202 |
| 2018/0241865 A1* | 8/2018 | Schee | G09F 9/301 |
| 2018/0321843 A1* | 11/2018 | Giannotti | G06F 3/04845 |
| 2019/0129596 A1 | 5/2019 | Ligameri et al. | |
| 2019/0317617 A1* | 10/2019 | Kogure | G06F 3/04842 |
| 2020/0302894 A1* | 9/2020 | Khen | G09G 5/14 |
| 2021/0294556 A1 | 9/2021 | Kamepalli et al. | |

\* cited by examiner

*Primary Examiner* — Rinna Yi
(74) *Attorney, Agent, or Firm* — Larson Newman, LLP

(57) ABSTRACT

An information handling system selects applicable display partitions based on the properties of a display screen, and determines a preferred window size of an application. The system adjusts a target zone of a window of the application based on the preferred window size.

20 Claims, 9 Drawing Sheets

| Resolution | | Aspect Ratio | Display Screen Size | Applicable Display Partition(s) |
|---|---|---|---|---|
| Horizontal Resolution | Vertical Resolution | | | |
| 1024 | 768 | 4:3 | 12 | 1 |
| 1366 | 768 | 16:9 | 13 | 1, 3 |
| 1920 | 1080 | 16:9 | 22 | 1,2,3,6,7,13 |
| 1920 | 1200 | 16:10 | 23 | 1,2,3,6,7 |
| 2048 | 1152 | 16:9 | 24 | 1,2,3,6,7 |
| 2560 | 1440 | 16:9 | 27 | 1,2,3,4,5,6,7,8,9,10,11,12,13,14,15,16 |
| 2560 | 1600 | 16:10 | 27 | 1,2,3,4,5,6,7,8,9,10,11,12,13,14,15,16 |
| 3840 | 2160 | 16:9 | 32 | 1,2,3,4,5,6,7,8,9,10,11,12,13,14,15,16,17,18 |
| 5120 | 2880 | 16:9 | 32 | 1,2,3,4,5,6,7,8,9,10,11,12,13,14,15,16,17,18,19 |
| 6144 | 3456 | 16:9 | 32 | 1,2,3,4,5,6,7,8,9,10,11,12,13,14,15,16,17,18,19 |
| 7680 | 4320 | 16:9 | 32 | 1,2,3,4,5,6,7,8,9,10,11,12,13,14,15,16,17,18,19 |
| 2560 | 1080 | 21:9 | 29 | 1,2,3,4,5,6,7,8,9,10 |
| 3440 | 1440 | 21:9 | 34 | 1,2,3,4,5,6,7,8,9,10,11,12,13,14,15,16 |
| 3840 | 1600 | 21:9 | 38 | 1,2,3,4,5,6,7,8,9,10,11,12,13,14,15,16,18 |
| 5120 | 1440 | 32:9 | 49 | 1,2,3,4,5,6,7,8,9,10,11,12,13,14,15,16,17,18,19 |

ADAPTIVE DISPLAY SCREEN PARTITIONING

FIELD OF THE DISCLOSURE

The present disclosure generally relates to information handling systems, and more particularly relates to adaptive display screen partitioning.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system selects applicable display partitions based on the properties of a display screen, and determines a preferred window size of an application. The system adjusts a target zone of a window of the application based on the preferred window size.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is a table that shows applicable display partition(s) associated with certain display properties, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
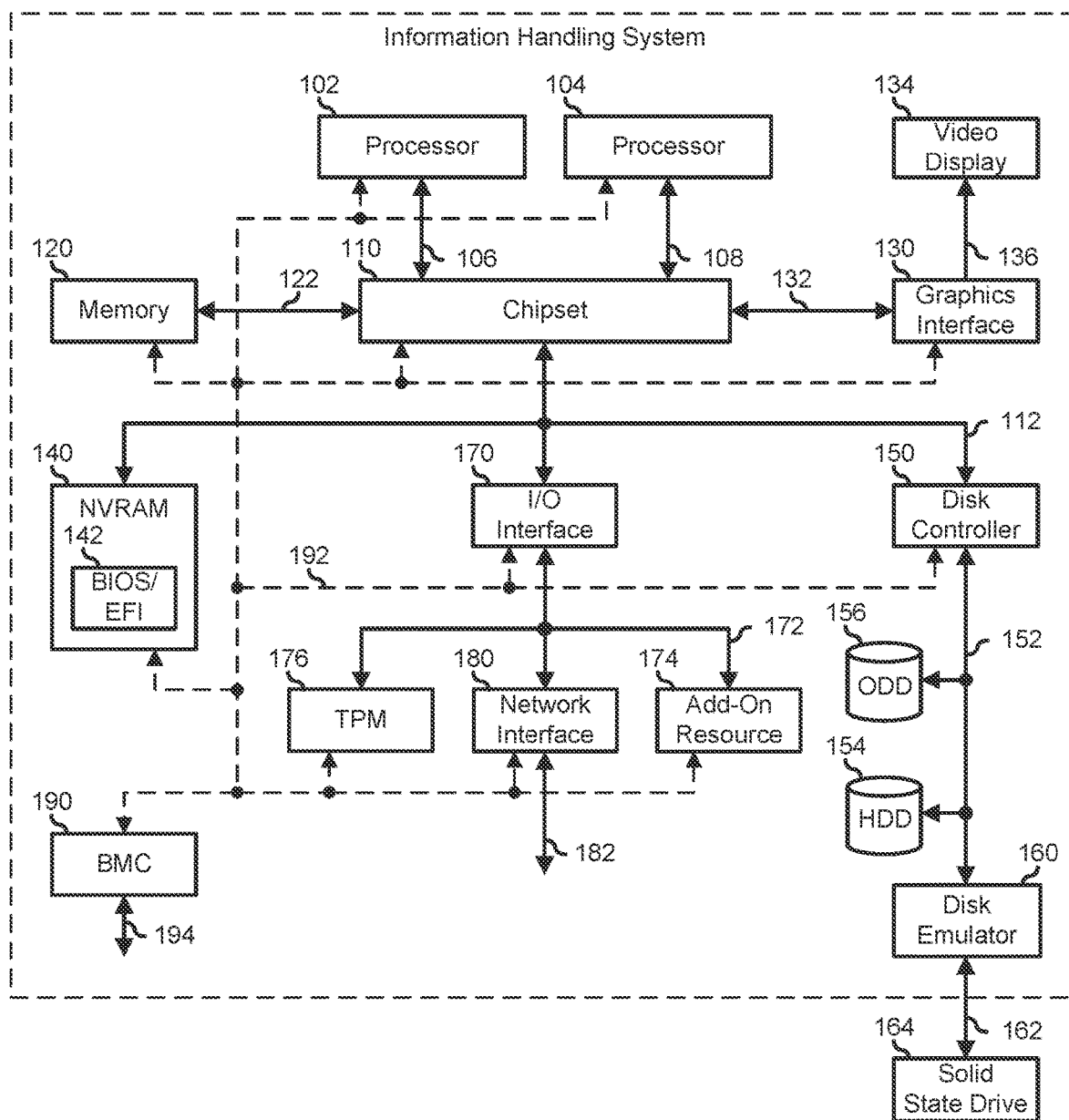
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a system-on-a-chip (SoC), or other control logic hardware. Information handling system 100 can also include one or more computer-readable media for storing machine-executable code, such as software or data.

A display manager or similar application typically includes a feature to help users organize their desktop into various pre-defined or custom window layouts for their display devices, such as video display 134. However these applications typically do not consider the physical properties of the display, the operating system settings, or the nature of the application window. Generally the display partitions are predefined and applied across all screen resolutions, sizes, and aspect ratios. When the display partition is applied, it is proportionally scaled to fit the display. However, the sizes of the zones in the display partitions may not be optimal or may not even be usable for the user's workflow. For example, different applications often require different optimal window sizes. Accordingly, the present disclosure provides a system and method for adaptive display screen partitioning that considers the preferred settings of the application. In particular, the display partitions offered for display may be adapted to the display screen properties, the affected operating system settings, and the nature of the current application.

Figure 2:
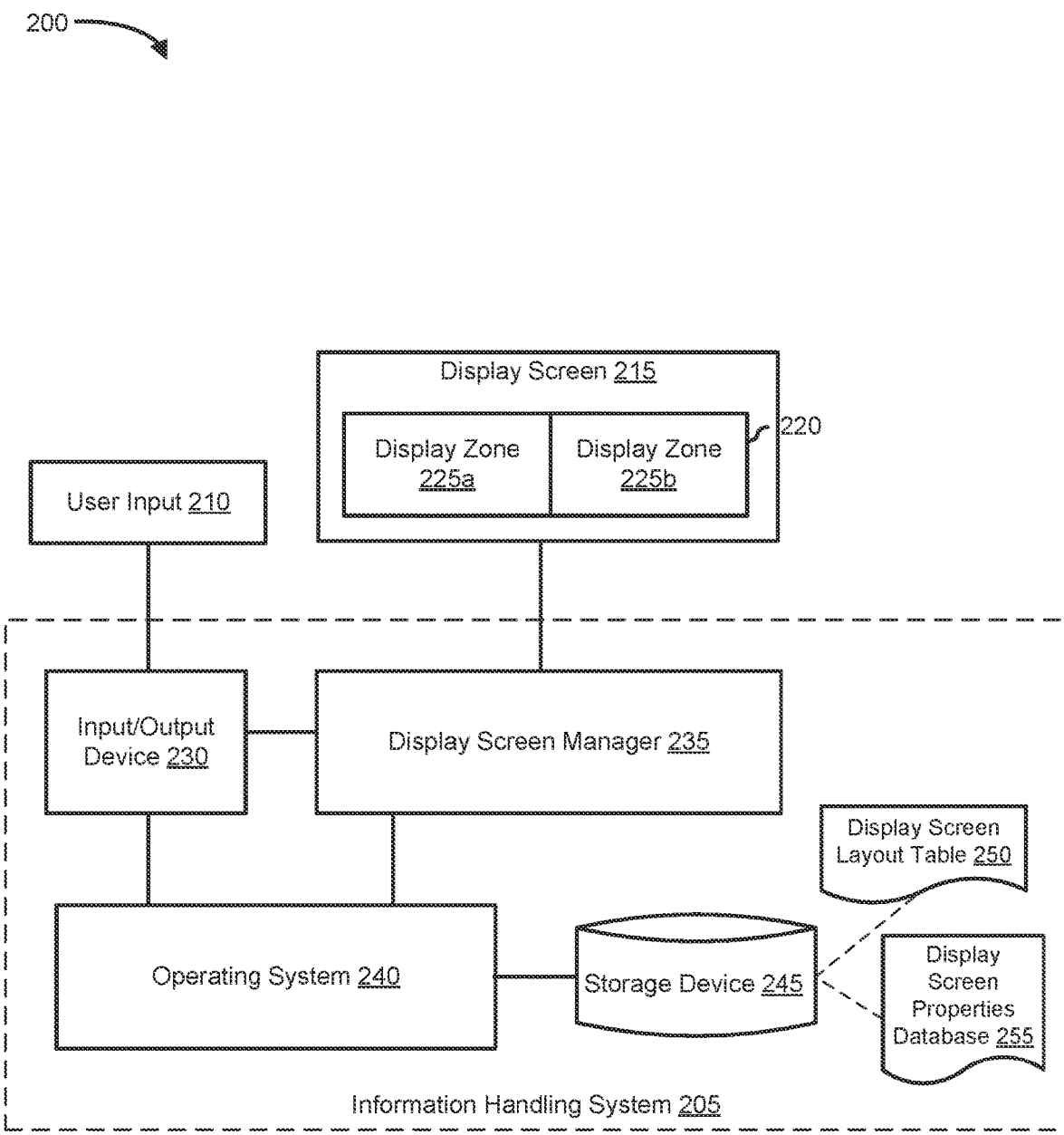
FIG. 2 is a block diagram illustrating a system for adaptive display screen partitioning, according to an embodiment of the present disclosure.

FIG. 2 shows a system 200 for adaptive display screen partitioning. System 200 includes an information handling system 205 and a display screen 215. Information handling system 205 includes an input/output device, a display screen manager 235, an operating system 240, and a storage device 245. The components of system 200 may be implemented in hardware, software, firmware, or any combination thereof. The components shown are not drawn to scale and information handling environment 205 may include additional or fewer components. In addition, connections between components may be omitted for descriptive clarity.

Display screen 215, which is similar to video display 134 of FIG. 1, includes a display partition 220 which further includes display zones 225a and 225b. Display partitions, such as display partition 220, offered for display screen 215 may be adapted to the display screen properties, such as resolution, size, and aspect ratio. Display partition 220 may be applied proportionally scaled to fit display screen 215. Display partition 220 may also be adapted to operating system settings such as a current operating system scaling applied to operating system 240. The current operating system scaling setting, also referred to as a dots per inch (DPI) scaling factor, may include scaling a size of a portion of the content on the display. The scaling factor may be set as a percentage. A lower DPI setting may make the content appear smaller, while a larger DPI setting may make the content appear larger.

In this example, the display partition is divided into two display zones, also referred to herein simply as zones. The size of each zone in the display partition may be adapted to the required or desired display window size of an application. Although it is shown that the display partition is applied to one display screen, display partition 220 may be applied across two or more display screens and/or display devices. For example, when there are two display screens, display zone 225a may encompass the first display screen while display zone 225b may encompass the second display screen. Further, display screen 215 may be included in information handling system 205, such as an embedded display screen associated with a portable information handling system, such as a laptop, a notebook, a 2-in-1 computer, a mobile device, etc.

Figure 7:
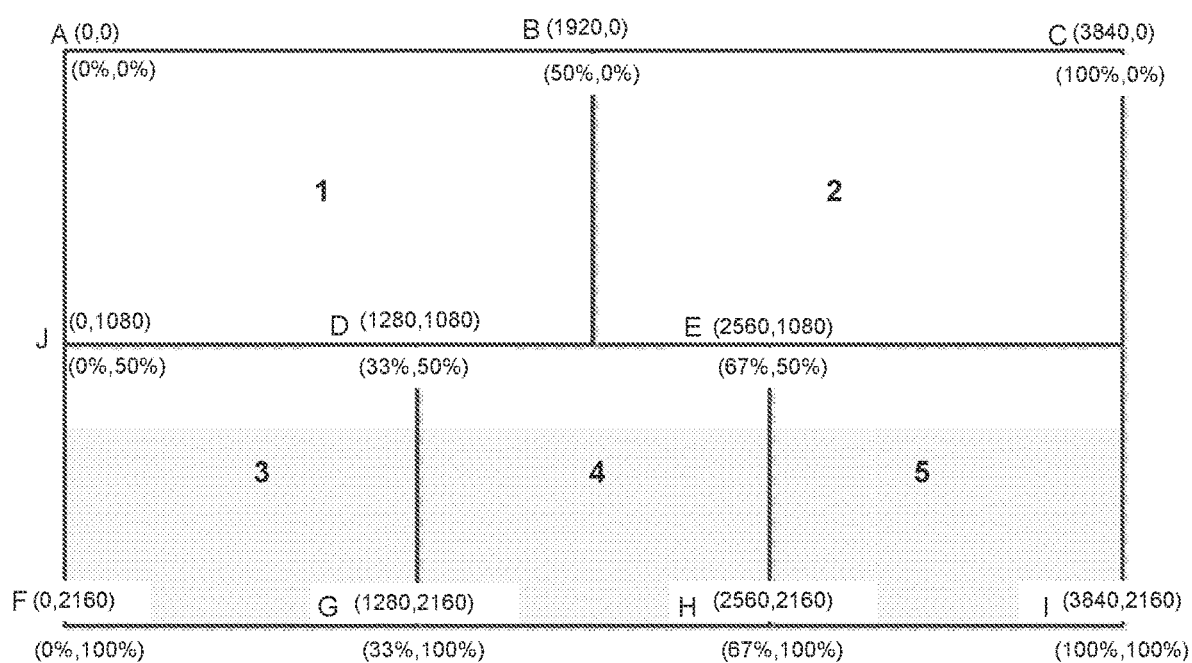
FIG. 7 is a diagram of a display partition with calculations associated with zone resolution and size for each zone, according to an embodiment of the present disclosure.

Display screen manager 235 may be configured to define one or more display screen layouts, such as display partition 220. Each display screen layout may include one or more zones, such as display zones 225a and 225b. Each zone may be defined with a specified length and a specified width and position at a pre-specified location, such as shown in FIG. 7. In addition, the user may have a user-preferred length and preferred width for a particular zone.

User input 210 may be provided by a user, via input/output device 230 which is accepted by operating system 240. For example, user input 210 may select, drag, or move actions made by a user to move or drag an object to a target zone, such as one of display zone 225a and display zone 225b. The object may be a file, an application, a folder, or the like. When the user moves or drags the object in proximity to the target zone, display screen manager 235 can interpret such action as hovering over the target zone. As the object hovers over the target region, display screen manager 235 may resize the target zone automatically to adapt the size of the target zone to the preferred settings and nature of the object. For example, the length and width of the target zone may be adjusted based on the preferred length and width of the selected object.

As the object is dropped or snapped into the target region, neighboring zone(s) may be repositioned and/or also resized automatically. For example, the length and width of neighboring zones that is to the left, right, top, or bottom of the target zone may also be adjusted equally. If the length and width of the target zone are increased, then to compensate, the length and width of the neighboring zones may be reduced. For example, if the application window was snapped into display zone 225a, display screen manager 235 may resize display zone 225a based on the application's preferred window size. Display screen manager 235 may also resize display zone 225b to accommodate the change in the size of display zone 225a relative to the screen size of display screen 215.

Storage device 245 may be a persistent data storage device configured to store data associated with display screen manager 235 and/or user input 210. For example, storage device 245 may store a display screen layout table 250 and a display screen properties database 255. Display screen layout table 250 may be similar to a table 400 of FIG. 4. Data screen properties database 820 may be associated with an application's preferred window size similar to the database of block 810 of FIG. 8. This data stored in storage device 245 may be used in adjusting the size of one or more zones of the display partition. Storage device 245 may include an NV-RAM, a solid state disk, a hard disk drive, a magnetic tape library, an optical disk drive, a magneto-optical disk drive, a compact disk drive, a compact disk array, a disk array controller, and/or any computer-readable medium operable to store data.

A user of information handling system 205 may provide a user input 210. In some cases, user input 210 may be used to create a custom display screen layout via input/output device 230. User input 210 may also be a move or drag event of an application window and/or to snap the application window to a display zone. The user may also update one or more tables or databases stored in storage device 245.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Figure 3:
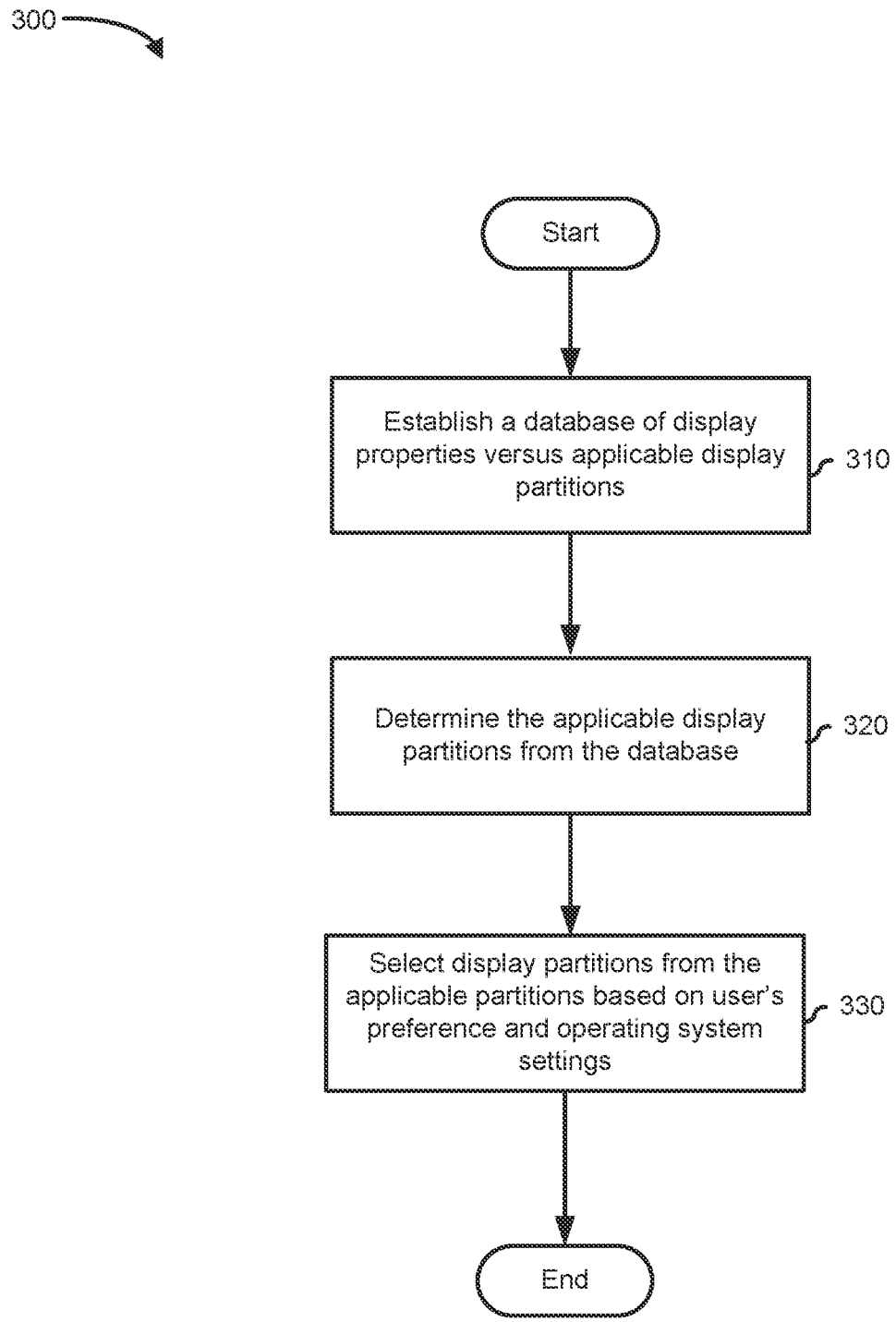
FIG. 3 is a flowchart illustrating a method for adaptive display screen partitioning, according to an embodiment of the present disclosure.

FIG. 3 shows a flowchart of a method 300 for adaptive display screen partitioning. Method 300 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 300 typically starts at block 310 where the method may establish a database of display properties versus applicable display partitions. For example, the database may be a table, such as table 400 in FIG. 4, which may be used to associate applicable display partitions to a particular set of display properties. The display properties may include the display's native horizontal and vertical resolutions, aspect ratio, the display's screen size, etc. The display properties may be used to determine the applicable display partitions.

At block 320, the method may select the applicable display partitions. The applicable display partitions may be selected from a set of display partitions that includes pre-defined and custom display partitions based on a set of criteria, such as shown in FIG. 4. The set of criteria may include the display's DPI, position, and size of each zone, the number of zones, user-defined criterion, etc.

At block 330, the method may further select display partitions from a set of applicable display partitions. The selection may be based on the user's or application's preferred settings and operating system settings, such as a current operating system scaling setting. For example, the user may have a set of criteria for selecting suitable display partitions, such as shown in table 1 below. In this example, the user preference includes a maximum of eight zones for a display partition with a minimum horizon resolution of 480 pixels and a maximum vertical resolution of 360 pixels for each zone. If the display screen meets the minimum DPI preferred by the user, then the method may look through the database for the applicable display partitions associated with the minimum zone resolution and the maximum number of zones. The applicable display partitions that meet the said criteria may be selected and presented to the user. The user can then choose one or more display partitions from the applicable display partitions presented.

TABLE 1

| Minimum Dots per Inch | Minimum Zone Horizontal Resolution | Minimum Zone Vertical Resolution | Maximum No. of Zones |
|---|---|---|---|
| 120 Pixels per Inch | 480 | 360 | 8 |

FIG. 4 shows table 400 shows applicable display partition(s) associated with certain display properties. In particular, table 400 shows applicable display partition(s) for a particular resolution, aspect ratio, and display screen size. The horizontal and vertical resolutions may be in pixels while the display screen size may be in inches or similar units of measure. In this example, table 400 includes an entry for each set of display properties and applicable display partition(s). For example, for a display screen with a horizontal resolution of 1,024 pixels, a vertical resolution of 768 pixels with an aspect ratio of 4:3, and a display screen size of 12 inches, the applicable display partitions include display partition 1. The applicable display partitions may be based on a set of display partitions as shown in FIG. 5.

Figure 5:
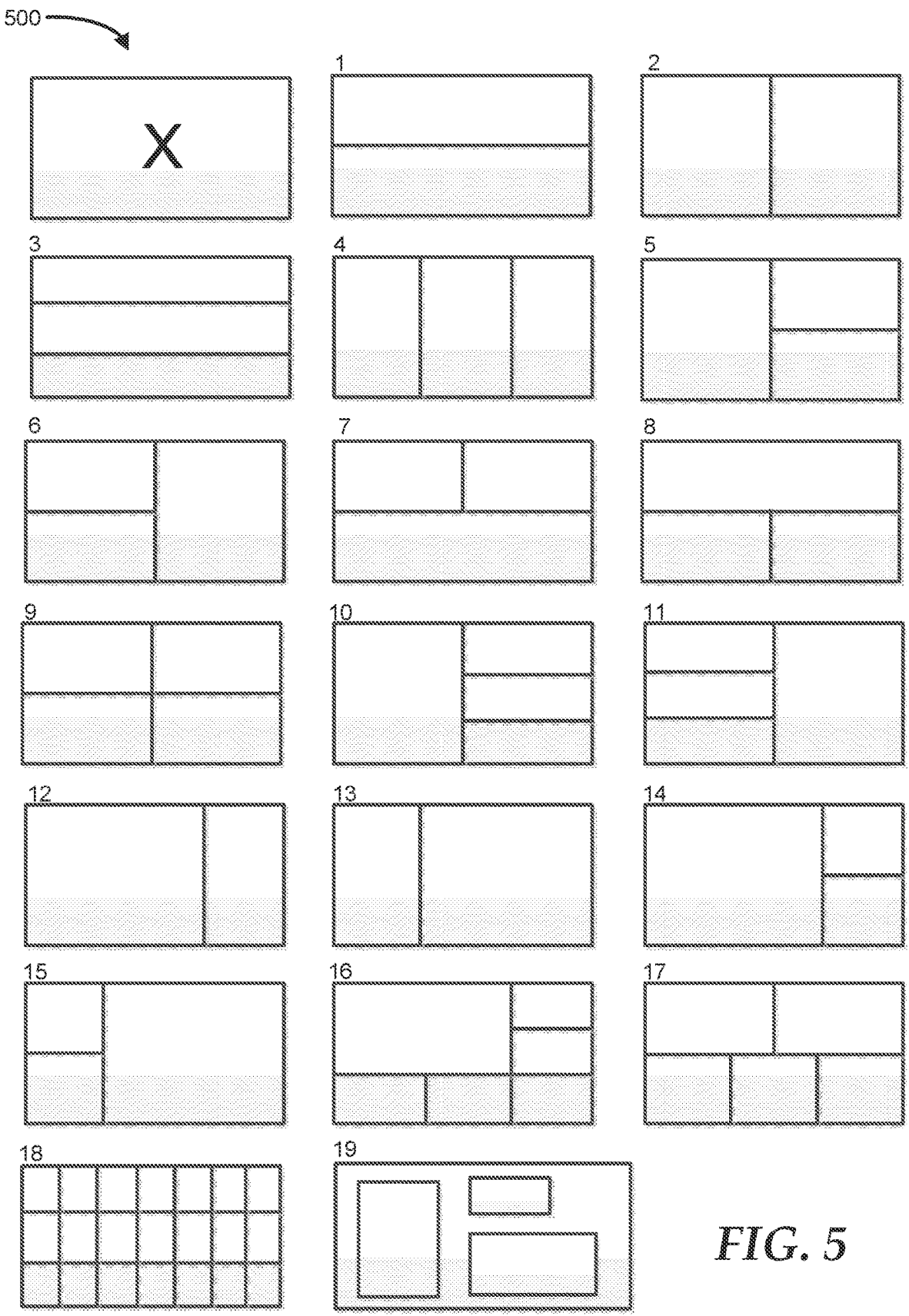
FIG. 5 is a diagram of a set of display partitions, according to an embodiment of the present disclosure.

FIG. 5 shows a set 500 of display partitions. Set 500 of display partitions includes pre-defined and user-defined display partitions. Each display partition may have a different layout. The display partitions include at least one zone. One of skill in the art will appreciate that this set shows an example of display partitions. Other display partitions with different layouts may be added to this set. Accordingly, one or more display partitions shown may be removed from this set without affecting the limitations of the present disclosure.

Figure 6:
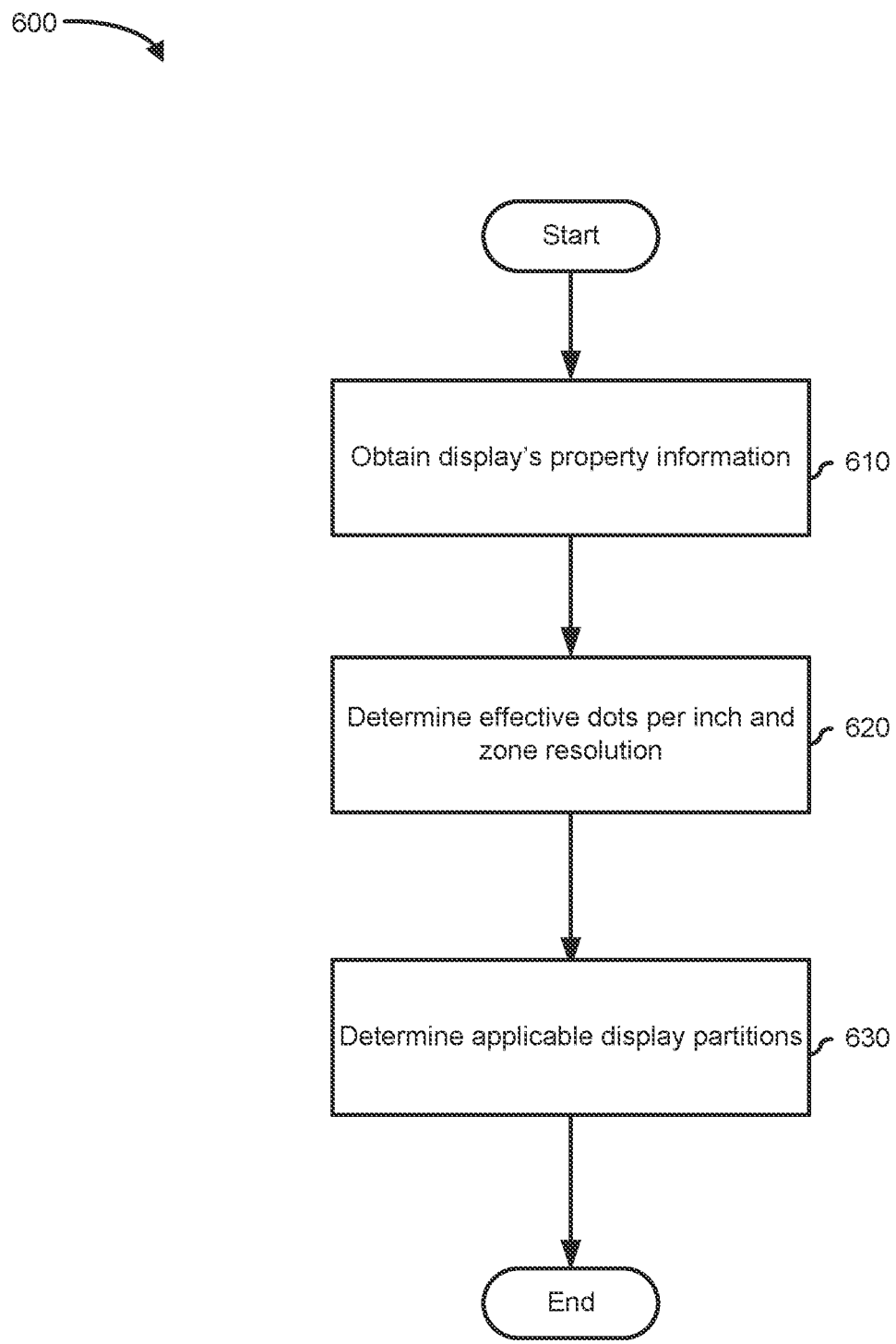
FIG. 6 is a flowchart illustrating a method for selecting a display partition from the applicable partitions, according to an embodiment of the present disclosure.

FIG. 6 shows a method 600 for selecting a display partition from the applicable display partitions. In particular, the display partitions may be selected from one or more applicable display partitions in table 400 of FIG. 4. Method 600 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 600 typically starts at block 610 where the method may obtain the display screen properties. For example, the method may use extended display identification data (EDID) read operations performed on the display screen to retrieve its EDID information, such as refresh rate, vendor information, maximum image size, color characteristics, serial number, panel resolution, etc. The EDID information can be stored in the display screen and provided to the information handling system via a display controller when the display screen is coupled to the information handling system for the first time. For the display screen that has been connected to the information handling system before, the display properties may be found in the system's registry. The display properties can also be stored in a non-volatile storage device, such as an NV-RAM, a hard disk, an SSD, or similar. For a multiple display screen setup, if the display partition is applied across the multiple display screens, based on a total native resolution. The total native resolution is the sum of the resolutions of all the participating display screens.

At block 620, the method may determine the effective DPI and zone resolution for the display screen. The effective DPI is the actual DPI used for content rendering. The effective DPI may be influenced by a current scaling setting in the operating system. The effective DPI may be calculated using the formula:

$$\text{Physical } DPI = \sqrt{H^2 + V^2} / \text{Display screen size}$$

Effective $DPI$ = Physical $DPI$/Operating system current scaling setting

The method may also calculate the effective resolution by calculating the actual resolution. For example, the method may calculate the width and height (x, y) resolution of the display screen as depicted in display partition 700 of FIG. 7. For example, given a resolution of 1920×1080, the display screen has a width or horizontal resolution of 1,920 pixels and a height or vertical resolution of 1,080 pixels which results in an actual resolution of 2,073,600 pixels. These calculations may be performed each time the current operating system scaling setting is changed.

Effective $X$ resolution =

(Zone $x$ % * height)/Operating system current scaling setting

Effective $Y$ resolution =

(Zone $y$ % * height)/Operating system current scaling setting

At block 630, the method determines applicable display partitions. The applicable partitions may be based on the effective DPI, the smallest zone size in the partition, and the number of zones in the partition. The applicable display partitions may be filtered based on the user's preferences. Table 2 shows a first set of applicable display partitions for a particular set of display properties in row number one. Table 2 also shows a second set of display partitions that are selected based on filtering according to the user's preferences, wherein the second set is a subset of the first set of display partitions. Accordingly, instead of presenting the user with the first set of applicable display partitions to choose from, the user may be presented with the second set of display partitions.

TABLE 2

| Row No. | Resolution | | Display | | |
| --- | --- | --- | --- | --- | --- |
| | Horizontal Resolution | Vertical Resolution | Aspect Ratio | Screen Size | Display Partitions |
| 1 | 2560 | 1440 | 16:9 | 27 | 1, 2, 3, 4, 5, 6, 7, 8, 9, 10, 11, 12, 13, 14, 15, 16 |
| 2 | 2560 | 1440 | 16:9 | 27 | 1, 2, 3, 4, 5, 6, 7, 8, 9, 10 |

FIG. 7 shows a display partition 700 with calculations associated with zone resolution and size for each zone, as discussed above. Display partition 700 includes five zones. The calculations may be based on various display properties. For example, display partition 700 has a horizontal resolution of 3840 pixels and a vertical resolution of 2160, an aspect ratio of 16:9, and a display screen size of 32 inches. In this example, zone 1 has a horizontal resolution of 1,920 pixels and a vertical resolution of 1,080 pixels. Zone 2 is similar in size to zone 1. Zone 3 has a horizontal resolution of 1,280 pixels and a vertical resolution of 1,080 pixels. Zones 4 and 5 are similar in size to zone 3. The height and width of display partition 700 may also be shown as a percentage of the display partition. For example, the width of zone 1 is 50% of the display partition 700, as shown from point A to point B. The height of zone 1 is 50% of the display partition 700, as shown from point A to point J.

Figure 8:
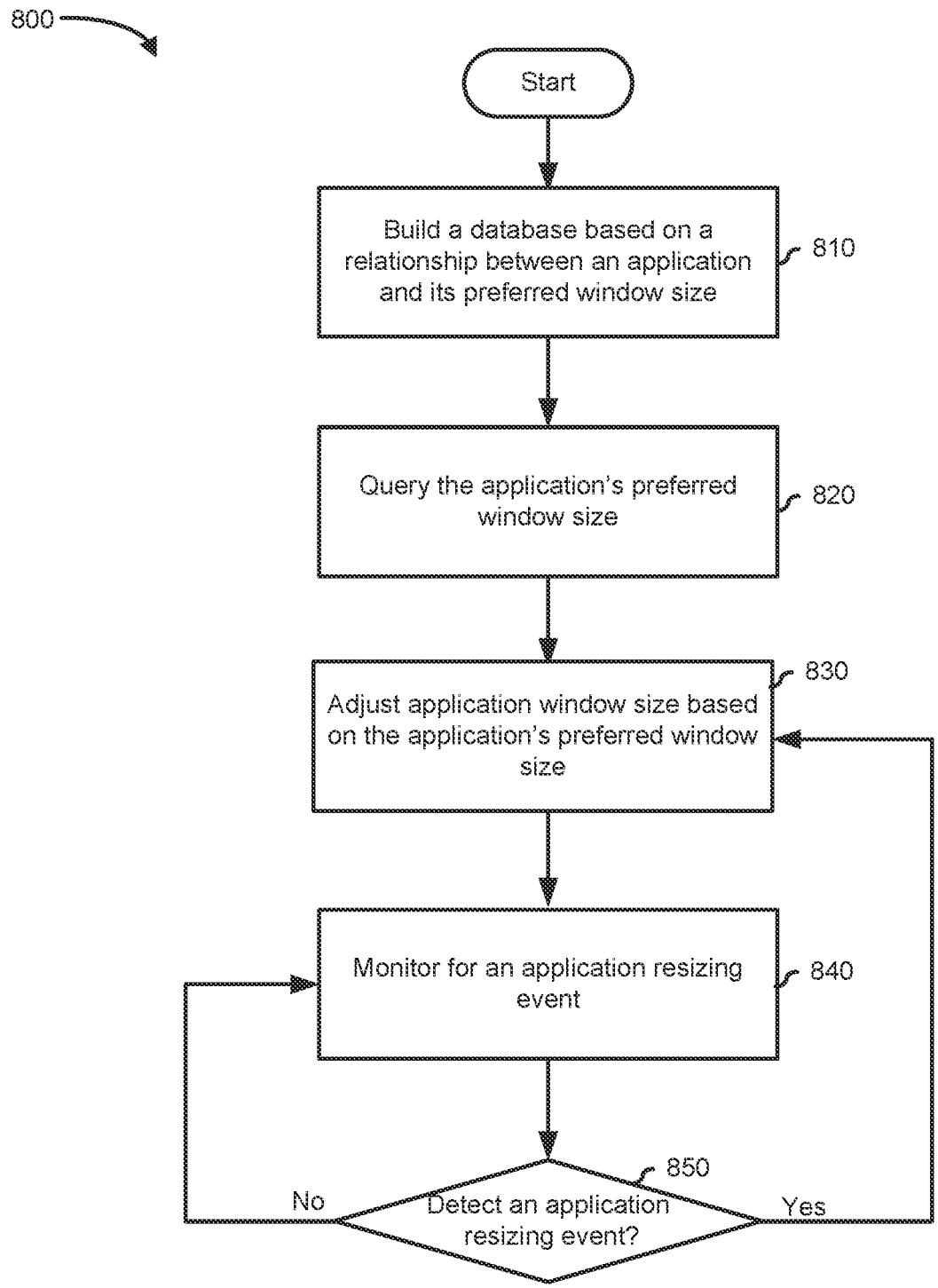
FIG. 8 is a flowchart of a method for dynamically adapting a display partition to a preferred resolution, according to an embodiment of the present disclosure.

FIG. 8 shows a flowchart of a method 800 for dynamically adapting a display partition to a preferred resolution. Method 800 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 800 typically starts at block 810 where the method may build a database that may be used to determine a relationship between an application at a particular state and its preferred window size, such as shown in table 3 below. The database may be updated automatically when a user manually resizes the application window after snapping the application window to the target zone. The update may be based on the horizontal and vertical resolution that the target zone was manually resized to. In another embodiment, the database can be built dynamically over time by sending the preferred window horizontal and vertical resolutions of the user to a telemetry server whenever the user manually resizes an application window.

TABLE 3

| Process Name | Application State | Preferred Window Horizontal Resolution | Preferred Window Vertical Resolution |
| --- | --- | --- | --- |
| Mplayer | Playing | 800 | 600 |
| WordEditor | Editing | 1500 | Nil |

At block 820, the method may query the operating system for the process name and current state of the application. The method may query the application for the preferred application window or canvas size when the application is clicked by the user before moving or dragging the application window to the target zone. If the method successfully queries the application's preferred window size, then the query result may be used by the method to resize the application window at block 830. Otherwise, the method may query the database for the application's preferred window size under the current application state.

At block 830, the method may resize or adjust the size of the application window and/or the target zone based on the application's preferred horizontal and vertical resolutions when the application window hovers over a target zone of a selected display partition before the user snapping the application window into the target zone. The resizing or adjustment may be based on the calculation below.

Horizontal resolution adjustment =

(Preferred horizontal resolution − Current horizontal resolution) *

Operating system current scaling setting

Vertical resolution adjustment =

(Preferred vertical resolution − Current vertical resolution) *

Operating system current scaling setting

The target zone may be adjusted towards the border of the display screen upon reaching the edges of the display screen. If there is one zone next to the target zone, such as to the left, right, top, or bottom, then the method may adjust the horizontal and/or vertical resolution of the neighboring zone. If there is more than one neighboring zone, then the method may adjust the horizontal and/or vertical resolutions of the neighboring zones equally. For example, the method may increase or reduce the horizontal and vertical resolutions of the neighboring zones. The user can configure how the method performs the adjustments. For example, the user may set up a rule that the adjustment of the neighboring zones may be disabled if the preferred application window is smaller than the target zone.

At block 840, the method may monitor the operating system for application events that may trigger resizing the zone associated with the application and/or its neighboring zones if any. The application event that may trigger the resizing may be referred to herein simply as an application resizing event. For example, the resizing event includes a user minimizing or maximizing the application window. The method proceeds to decision block 850, the method may determine if it detects a resizing event. If the method detects an application resizing event, then the "YES" branch is taken, and the method proceeds to block 830. If the method does not detect an application resizing event, then the "NO" branch is taken, and the method proceeds to block 840. The method may have subscribed to application resizing events that may influence the size of the application window.

Figure 9:
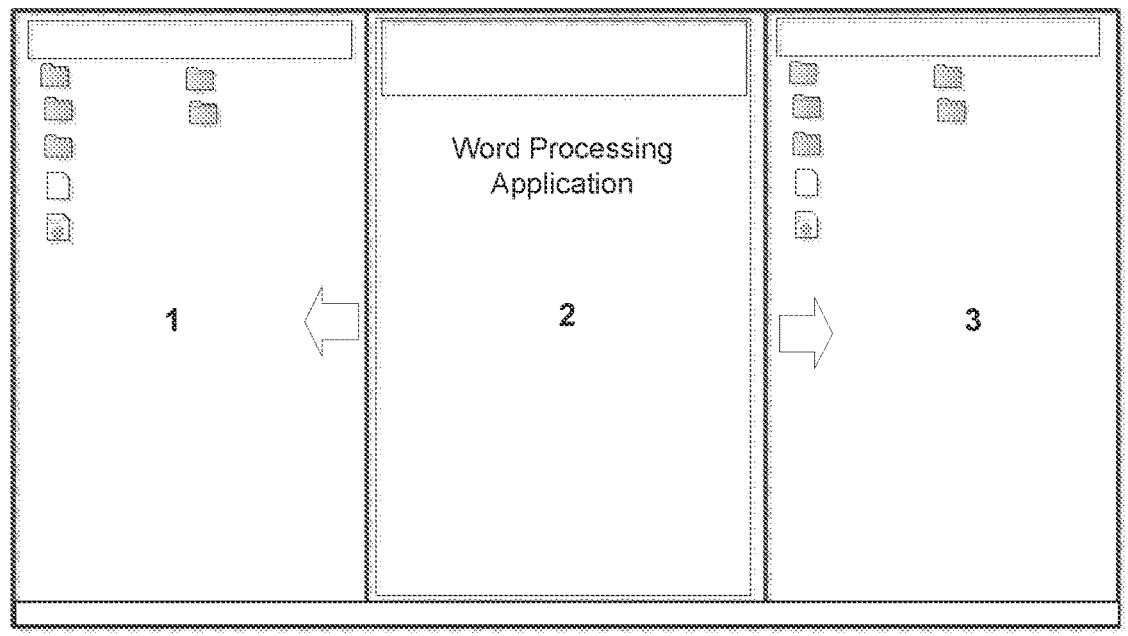
FIG. 9 is a diagram of a display partition configured for adaptive display screen partitioning, according to an embodiment of the present disclosure.

FIG. 9 shows a display partition 900 configured for adaptive display screen partitioning. In this example, display partition 900 includes zones 1-3, wherein zone 2 may be a target zone of an application window of a word processing software, wherein zone 2 may be narrower than the preferred horizontal resolution. Because of the nature of a word processing application, a wider horizontal resolution is beneficial for the user in reading text.

Figure 10:
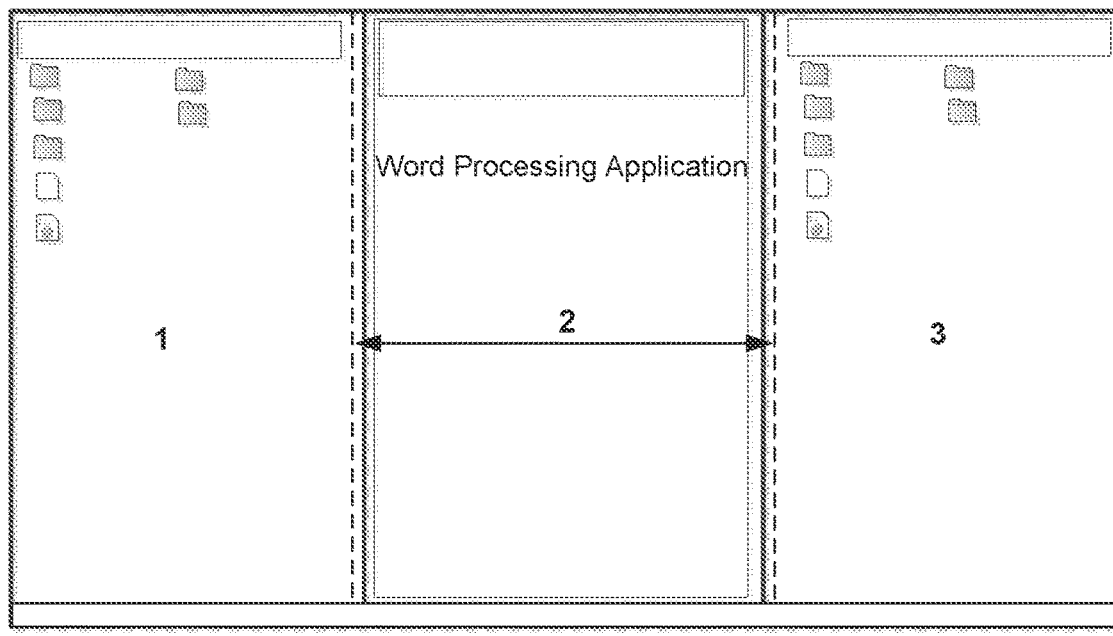
FIG. 10 is a diagram of a display partition configured for adaptive display screen partitioning, according to an embodiment of the present disclosure.

FIG. 10 shows display partition 1000 configured for adaptive display screen partitioning. In particular, display partition 1000 is a representation of display partition 900 after the target zone was resized based on the preferred horizontal resolution of the application. The neighboring zones on the left and right sides of the target zone may also be resized to accommodate the increase in horizontal resolution of the target zone.

Although FIG. 3, FIG. 6, and FIG. 8 show example blocks of method 300, method 600, and method 800 in some implementations, method 300, method 600, and method 800 may include additional blocks, fewer blocks, different blocks, or differently arranged blocks than those depicted in FIG. 3, FIG. 6, and FIG. 8. Those skilled in the art will understand that the principles presented herein may be implemented in any suitably arranged processing system. Additionally, or alternatively, two or more of the blocks of method 300, method 600, and method 800 may be performed in parallel. For example, blocks 830 and 840 of method 800 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   determining, by a processor, properties of a display screen including dots per inch and an aspect ratio;
   when the display screen meets a minimum dots per inch based on a user preference, then selecting a first set of applicable display partitions based on the properties including the minimum dots per inch, the aspect ratio of the display screen, and a number of zones in the first set of applicable display partitions based on the user preference;
   filtering the first set of applicable display partitions based on the user preference resulting in a second set of applicable display partitions, wherein the second set of applicable display partitions is a subset of the first set of applicable display partitions;
   determining dynamically a preferred window size of an application from the second set of applicable display partitions; and
   resizing a target zone of a window of the application displayed on the display screen based on the preferred window size.

2. The method of claim 1, wherein the properties of the display screen includes a horizontal resolution and a vertical resolution.

3. The method of claim 1, wherein the selecting of the first set of applicable display partitions is further based on an operating system scaling setting.

4. The method of claim 1, wherein the selecting of the first set of applicable display partitions is further based on a minimum horizontal resolution and a minimum vertical resolution of the target zone.

5. The method of claim 1, wherein the resizing of the target zone when the window of the application hovers on the target zone.

6. The method of claim 1, wherein the resizing of the target zone when the window of the application is in response to detecting an event.

7. The method of claim 1, further comprising subsequent to adjusting the target zone, resizing a neighboring zone of the target zone.

8. The method of claim 1, wherein the determining of the preferred window size of the application is performed at snapping of the window of the application in the target zone.

9. The method of claim 1, wherein the first set of applicable display partitions is applied to fit the display screen.

10. The method of claim 1, wherein the first set of applicable display partitions is applied to fit two display screens.

11. The method of claim 1, further comprising in response to a user manually resizing the target zone, updating a database with a preferred horizontal resolution and vertical resolution.

12. An information handling system, comprising:
a processor; and
a memory device storing instructions that when executed cause the processor to perform operations including:
determining properties of a display screen including dots per inch and an aspect ratio;
when the display screen meets a minimum dots per inch based on an application's preferred settings, then selecting a first set of applicable display partitions based on the properties of the display screen including the minimum dots per inch, the aspect ratio, and number of zones in a display partition based on the application's preferred settings;
filtering the first set of applicable display partitions based on the application's preferred settings resulting in a second set of display partitions, wherein the second set of applicable display partitions is a subset of the first set of applicable display partitions;
determining dynamically a preferred window size of an application from the second set of applicable display partitions; and
adjusting a target zone of a window of the application displayed on the display screen based on the preferred window size.

13. The information handling system of claim 12, wherein the properties of the display screen includes a horizontal resolution and a vertical resolution.

14. The information handling system of claim 12, wherein the selecting of the first set of applicable display partitions is further based on an operating system scaling setting.

15. The information handling system of claim 12, wherein the selecting of the first set of applicable display partitions is further based on a minimum horizontal resolution and a minimum vertical resolution of the target zone.

16. The information handling system of claim 12, wherein the adjusting of the target zone when the window of the application hovers on the target zone.

17. A non-transitory computer-readable medium to store instructions that are executable to perform operations comprising:
selecting applicable display partitions based on properties of a display screen including dots per inch and an aspect ratio;
when the display screen meets a minimum dots per inch based on a user preference, then selecting a first set of applicable display partitions based on the properties of the display screen including the minimum dots per inch, the aspect ratio, and number of zones in a display partition based on the user preference;
filtering the first set of applicable display partitions based on the user preference resulting in a second set of applicable display partitions, wherein the second set of applicable display partitions is a subset of the first set of applicable display partitions;
determining dynamically a preferred window size of an application from the second set of applicable display partitions; and
adjusting a target zone of a window of the application displayed on the display screen based on the preferred window size.

18. The non-transitory computer-readable medium of claim 17, wherein the selecting of the first set of applicable display partitions is further based on a minimum horizontal resolution and a minimum vertical resolution of the target zone.

19. The non-transitory computer-readable medium of claim 17, wherein the adjusting of the target zone when the window of the application hovers on the target zone.

20. The non-transitory computer-readable medium of claim 17, further comprising subsequent to adjusting the target zone, resizing a neighboring zone of the target zone.

* * * * *